United States Patent
Wellman et al.

(10) Patent No.: US 11,922,326 B2
(45) Date of Patent: Mar. 5, 2024

(54) DATA MANAGEMENT SUGGESTIONS FROM KNOWLEDGE GRAPH ACTIONS

(71) Applicant: BackOffice Associates, LLC, Needham Heights, MA (US)

(72) Inventors: Kyl Wellman, Aurora, CO (US); Jon Green, Brixworth (GB); Tyler Warden, Atlanta, GA (US); James Maniscalco, Milton, MA (US); Rex Ahlstrom, Herndon, VA (US)

(73) Assignee: BackOffice Associates, LLC, Needham Heights, MA (US)

( * ) Notice: Subject to any disclaimer, the term of this patent is extended or adjusted under 35 U.S.C. 154(b) by 0 days.

(21) Appl. No.: 17/896,927

(22) Filed: Aug. 26, 2022

(65) Prior Publication Data

US 2023/0068340 A1 Mar. 2, 2023

Related U.S. Application Data

(60) Provisional application No. 63/240,282, filed on Sep. 2, 2021.

(51) Int. Cl.
*G06N 5/02* (2023.01)
*G06F 40/40* (2020.01)
*G06N 5/022* (2023.01)

(52) U.S. Cl.
CPC ............. *G06N 5/022* (2013.01); *G06F 40/40* (2020.01)

(58) Field of Classification Search
CPC ....................................................... G06F 40/40
See application file for complete search history.

(56) References Cited

U.S. PATENT DOCUMENTS

2014/0351241 A1 11/2014 Leask et al.
2017/0154108 A1* 6/2017 Kraus ................... G06F 16/367
(Continued)

OTHER PUBLICATIONS

Cardoso, Silvio Domingos, Marcos Da Silveira, and Cédric Pruski. "Construction and exploitation of an historical knowledge graph to deal with the evolution of ontologies." Knowledge-Based Systems 194 (2020): 105508. (Year: 2020).*
(Continued)

*Primary Examiner* — Casey R. Garner
(74) *Attorney, Agent, or Firm* — Fish & Richardson P.C.

(57) ABSTRACT

Approaches are described for generating suggestions for new nodes or new relationships in a knowledge graph based on content of data assets represented by existing nodes in the knowledge graph. The knowledge graph is defined by nodes connected by edges. A method includes determining that a data asset represented by a root node of a knowledge graph has been changed, where the changed data asset is represented by a version node connected to the root node. The changed data asset is processed, including: identifying one or more candidate terms in the changed data asset, and comparing each candidate term with each of one or more existing terms from data assets of the knowledge graph other than the changed data asset to obtain (i) one or more of the candidate terms that do not correspond to any existing term or (ii) one or more candidate terms that each corresponds to a respective existing term that is not related to the version node representing the changed data asset. A suggestion node is generated for each of the obtained candidate terms, each suggestion node connected to the version node representing the changed data asset, wherein each suggestion node indicates a suggestion for a new node or a new edge in the knowledge graph. Information indicative of each suggestion is displayed on a user interface.

18 Claims, 6 Drawing Sheets

(56) References Cited

U.S. PATENT DOCUMENTS

| | | |
|---|---|---|
| 2018/0218005 A1 | 8/2018 | Kuhtz et al. |
| 2019/0095507 A1 | 3/2019 | Elisseeff et al. |
| 2019/0384836 A1 | 12/2019 | Roth et al. |
| 2020/0176113 A1 | 6/2020 | Megerian et al. |
| 2020/0342462 A1 | 10/2020 | Todd et al. |
| 2023/0021309 A1 | 1/2023 | Ahlstrom et al. |

OTHER PUBLICATIONS

Song, Dezhao, Frank Schilder, Shai Hertz, Giuseppe Saltini, Charese Smiley, Phani Nivarthi, Oren Hazai et al. "Building and querying an enterprise knowledge graph." IEEE Transactions on Services Computing 12, No. 3 (2017): 356-369. (Year: 2017).*

International Search Report and Written Opinion in International Appln. No. PCT/US2022/075671, dated Nov. 23, 2022, 13 pages.

\* cited by examiner

DATA MANAGEMENT SUGGESTIONS FROM KNOWLEDGE GRAPH ACTIONS

RELATED APPLICATIONS

This application claims priority to U.S. Provisional Application No. 63/240,282, filed on Sep. 2, 2021, the contents of which are incorporated here by reference in their entirety.

BACKGROUND

Knowledge graphs are used to store data in which data entities have relationships with one another.

SUMMARY

The present disclosure relates to approaches to generating suggestions for new nodes or new relationships in a knowledge graph based on content of entities represented by existing nodes in the knowledge graph. A knowledge graph is a directed graph with node(s) representing entities, such as data assets, and edge(s) representing relationships between pairs of entities. A user of the knowledge graph can make changes to the knowledge graph, e.g., by creating a new data asset or modifying an existing data asset. When a change is made to the knowledge graph, the content of the change is analyzed automatically to generate suggestions for additional changes to the knowledge graph, e.g., new data assets (nodes) or relationships (edges) suggested to be generated in the knowledge graph. For instance, suggestions for new data assets or new relationships can be generated based on terms that are present in the content of an update to the knowledge graph. New nodes or edges in the knowledge graph can be generated according to these suggestions automatically or responsive to user input.

In an aspect, a computer-implemented method includes determining that a data asset represented by a root node of a knowledge graph stored in a database has been changed, wherein the knowledge graph is defined by nodes connected by edges, and wherein the changed data asset is represented by a version node connected to the root node. The method includes processing the changed data asset, including: identifying one or more candidate terms in the changed data asset, and comparing each candidate term with each of one or more existing terms from data assets of the knowledge graph other than the changed data asset to obtain (i) one or more of the candidate terms that do not correspond to any existing term or (ii) one or more candidate terms that each corresponds to a respective existing term that is not related to the version node representing the changed data asset. The method includes generating a suggestion node for each of the obtained candidate terms, each suggestion node connected to the version node representing the changed data asset, wherein each suggestion node indicates a suggestion for a new node or a new edge in the knowledge graph; and enabling display, on a user interface, of information indicative of each suggestion.

Embodiments can include one or any combination of two or more of the following features.

The method includes identifying the one or more existing terms from the data assets in the knowledge graph other than the changed data asset.

Determining that a data asset has been changed includes determining that the version node has been generated.

Each suggestion node is connected to the version node representing the changed data asset by an edge of the knowledge graph.

Identifying one or more candidate terms includes applying natural language processing to text associated with the changed data asset.

Identifying one or more candidate terms includes identifying one or more nouns from the changed data asset.

Processing the changed data asset includes generating and processing (i) a first data set including the one or more existing terms, (ii) a second data set including the one or more candidate terms, and (iii) a third data set including one or more of the existing terms that are already related to the version node of the changed data asset in the knowledge graph. In some cases, processing the changed data asset includes normalizing the terms in each data set; sorting the normalized terms in each data set; and grouping the sorted and normalized terms based on a comparison of terms across the first, second, and third data sets. In some cases, normalizing the terms in each data set includes rendering each term in lowercase, removing whitespaces in each term, and stemming each term. In some cases, sorting the normalized terms in each data set includes sorting the terms in each data set alphabetically.

Generating a suggestion node includes, for each candidate term that corresponds to an existing term that is not related to the version node, generating a suggestion node representative of a suggested edge between a node representing the existing term and the version node.

Generating a suggestion node includes, for each candidate term that does not correspond to any existing term, generating a suggestion node representative of a suggested new node for the candidate term.

Enabling display, on a user interface, of information indicative of the suggestion includes enabling display of a user selectable element to accept, reject, or defer the suggestion.

The method includes, in response to a user interaction with the user interface during display of the information indicative of the suggestion, modifying the knowledge graph based on the suggestion for a new node indicated by a particular suggestion node to generate a new term node, in which the new term node represents one of the candidate terms that does not correspond to any existing term, in which the new term node is connected to the version node representing the changed data asset by an edge of the knowledge graph. In some cases, the new term node is connected to the particular suggestion node by an edge of the knowledge graph.

The method includes, in response to a user interaction with the user interface during display of the information indicative of the suggestion, modifying the knowledge graph based on the suggestion for a new edge indicated by a particular suggestion node to generate a new edge between the version node representing the changed data asset and a node representing one of the existing terms. In some cases, the new edge between the version node and the node representing the existing term is connected to the particular suggestion node by an edge of the knowledge graph.

The method includes detecting a duplicate suggestion based on the obtained candidate terms and previously generated suggestion nodes representative of previous suggestions. In some cases, the method includes, in response to detecting a duplicate suggestion for a new node or new edge, generating a single suggestion node representative of the duplicate suggestion.

The method includes ranking the suggestions based on a predicted impact, to the knowledge graph, of the new node or new edge corresponding to each of the suggestions.

In an aspect, a system includes one or more processors and one or more storage devices storing instructions that are operable, when executed by the one or more processors, to cause the one or more processors to perform one or more of the foregoing features.

In an aspect, a non-transitory computer readable medium encoded with a computer program includes instructions that are operable, when executed by one or more processors, to cause the one or more processors to perform one or more of the foregoing features. In an aspect, a non-transitory computer readable medium encoded with a computer program, the program including instructions that are operable, when executed by one or more processors, to cause the one or more processors to perform operations including determining that a data asset represented by a root node of a knowledge graph stored in a database has been changed. The knowledge graph is defined by nodes connected by edges. The changed data asset is represented by a version node connected to the root node. The instructions cause the one or more processors to perform operations including processing the changed data asset, including: identifying one or more candidate terms in the changed data asset, and comparing each candidate term with each of one or more existing terms from data assets of the knowledge graph other than the changed data asset to obtain (i) one or more of the candidate terms that do not correspond to any existing term or (ii) one or more candidate terms that each corresponds to a respective existing term that is not related to the version node representing the changed data asset; generating a suggestion node for each of the obtained candidate terms, each suggestion node connected to the version node representing the changed data asset; and enabling display, on a user interface, of information indicative of each suggestion. Each suggestion node indicates a suggestion for a new node or a new edge in the knowledge graph.

Embodiments of this aspect can include one or any combination of two or more of the foregoing features.

In an aspect, a computing system includes one or more processors and one or more storage devices storing instructions that are operable, when executed by the one or more processors, to cause the one or more processors to perform operations including determining that a data asset represented by a root node of a knowledge graph stored in a database has been changed. The knowledge graph is defined by nodes connected by edges. The changed data asset is represented by a version node connected to the root node. The one or more processors and one or more storage devices storing instructions are configured to processing the changed data asset, including: identifying one or more candidate terms in the changed data asset, and comparing each candidate term with each of one or more existing terms from data assets of the knowledge graph other than the changed data asset to obtain (i) one or more of the candidate terms that do not correspond to any existing term or (ii) one or more candidate terms that each corresponds to a respective existing term that is not related to the version node representing the changed data asset; generating a suggestion node for each of the obtained candidate terms, each suggestion node connected to the version node representing the changed data asset; and enabling display, on a user interface, of information indicative of each suggestion. Each suggestion node indicates a suggestion for a new node or a new edge in the knowledge graph.

Embodiments of this aspect can include one or any combination of two or more of the foregoing features.

Embodiments of the subject matter described in this specification can be implemented so as to realize one or more of the following advantages. Generating and implementing suggestions for new nodes and/or edges in a knowledge graph can help improves the understanding of data within the knowledge graph and the user's experiences interacting with the knowledge graph. For example, the generation of new nodes and edges in the knowledge graph can make the knowledge graph more enriching, e.g., by revealing a previously unnoticed relationship between two data assets or by revealing the relevance of a concept as a data asset. Because the approaches to generating suggestions are event-driven (e.g., initiated after detecting an event, such as a change to a knowledge graph), suggestions can be generated while conserving computational energy, memory, and time. In addition, identifying candidate terms for which nodes or edges may be warranted based on groupings of terms can facilitate computationally efficient processing. Application of natural language processing to identify terms that may warrant generation of nodes or edges in the knowledge graph can facilitate identification of terms that may have been overlooked, e.g., by a human reviewer. Natural language processing also can identify suggestions that are more likely to be accepted by a user based, e.g., on a prior history of the user's interaction with suggestions.

The details of one or more implementations are set forth in the accompanying drawings and the description below. Other features, aspects, and advantages will be apparent from the description and drawings, and the claims.

BRIEF DESCRIPTION OF THE DRAWINGS

Like reference numbers and designations in the various drawings indicate like elements.

DETAILED DESCRIPTION

The present disclosure relates to approaches to generating suggestions for new nodes or new relationships in a knowledge graph based on content of entities represented by existing nodes in the knowledge graph. A knowledge graph is a directed graph with node(s) representing entities, such as data assets, and edge(s) representing relationships between pairs of entities. A user of the knowledge graph can make changes to the knowledge graph, e.g., by creating a new data asset or modifying an existing data asset. When a change is made to the knowledge graph, the content of the change is analyzed automatically to generate suggestions for additional changes to the knowledge graph, e.g., new data assets (nodes) or relationships (edges) suggested to be generated in the knowledge graph. For instance, suggestions for new data assets or new relationships can be generated based on terms that are present in the content of an update to the knowledge graph. New nodes or edges in the knowledge graph can be generated according to these suggestions automatically or responsive to user input.

Figure 1A:
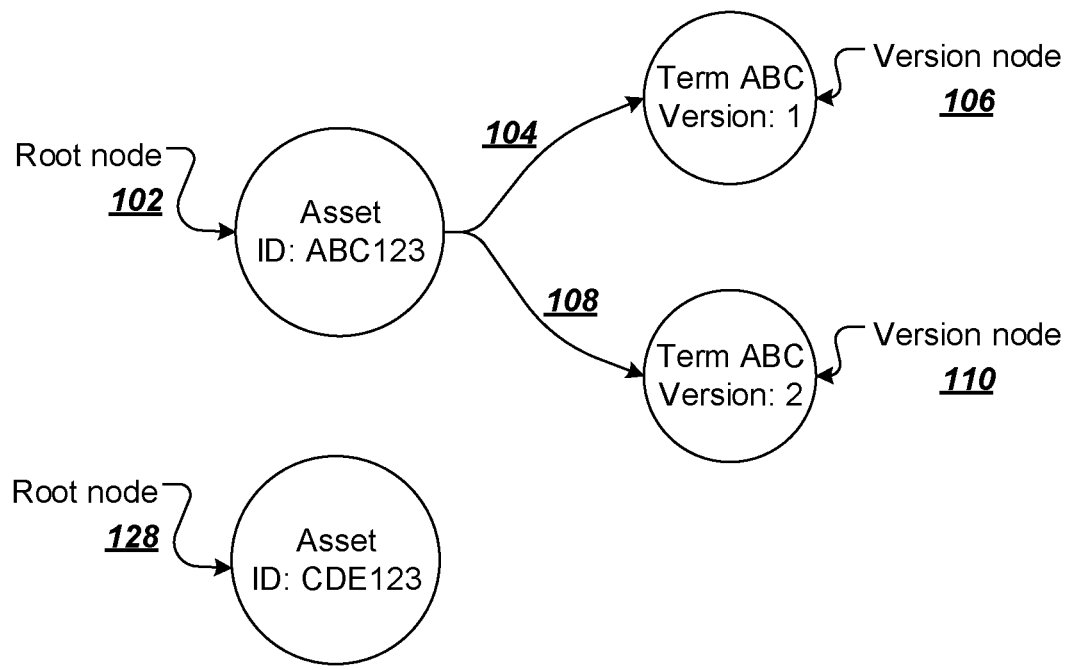
FIGS. 1A, 1B, and 1C illustrate an example knowledge graph.

FIG. 1A illustrates an example knowledge graph 100 that stores or references entities that are represented as nodes 102, 106, 110, and 128. Relationships between pairs of entities are represented by edges 104 and 108. A relationship can be direct (e.g., the node 102 is directly connected to node 106 via the edge 104) or indirect (e.g., two nodes are not directly connected by an edge but share a mutual relationship with another node). The knowledge graph, including the entities and their relationships, are stored in one or more databases.

In a specific example, a knowledge graph allows for management of enterprise scale knowledge, such as disparate systems and data and tribal knowledge, by providing a mechanism to traverse relationships among the knowledge entities. Governance resources for the enterprise, referred to as assets, constitute the entities stored in the knowledge graph. Assets are data objects for which multiple versions can be stored in the knowledge graph, with each version being represented by a node of the knowledge graph. Examples of assets include rules (e.g., standards that assert business structure); policies (e.g., definitions of processes, standards, or other protocols); goals (objectives, such as program or company objectives); initiatives (tasks, such as objectives or projects, to be completed to achieve a goal); visions (guides for distribution, e.g., sharing or reusing, of information to create value that contributes to an objective); programs (data governance programs); missions (short-term focal points for a program or company); systems (sources of record systems for external governance data); fields (fields in a record system, e.g., column names); and datasets (subsets of fields from one or more systems).

Other nodes of the knowledge graph (e.g., nodes that do not represent assets) represent resources. In some implementations, resources are data objects stored external to the knowledge graph and referenced by a unique identifier. In some implementations, resources are data objects stored in the knowledge graph. Unlike assets, resources are not versioned, meaning only a single version of each resource exists. Examples of resources include categories (mechanisms for grouping assets into groups, such as user-defined groups); category values (pre-defined values for a particular category); comments (user comments on a resource); users (users of the knowledge graph or resources stored therein); tenants (client-owned collections of resources); fields (fields in a record system, e.g., column names); and enforcement profiles (standards that assert business structure).

Generally, in a knowledge graph, relationships between pairs of entities are represented by directed edges, e.g., edges 104 and 108. For instance, in the knowledge graphs described here, an edge connects a node representing a data asset with a node representing a version of that data asset. The relationships can be system-defined or user-defined. Relationships can be created, changed, or deleted by user interaction with a user interface to the knowledge graph 100. Relationships are directional, directed from a subject to an object, and imply their inverse, e.g., a relationship from subject A to object B implies an additional relationship from subject B to object A. A relationship is characterized as a subject-predicate-object expression (e.g., "TermA [subject] is_like [predicate] TermB [object]," "TermC [subject] is_governed_by [predicate] RuleB [object]," or "RuleA [subject] is related to [predicate] TermB [object]."). Each relationship is characterized by a name, which is the name of the predicate from the subject's perspective, and an inverse name, which is the name of the predicate from the object's perspective. The knowledge graph 100, including the data assets and their relationships, are stored in one or more data stores, such as databases or spreadsheets.

Asset versions stored in a knowledge graph have a status as either a published version or a draft version. The status of an asset version is indicated by a status indicator associated with the version, the state (e.g., value) of which indicates the status of the corresponding asset version. For instance, the status indicator can have a state of "true" or "1" to indicate a published version and a state of "false" or "0" to indicate a draft version. A published version of an asset is immutable, meaning that they cannot be changed (e.g., by a user or by the system) once published in the graph. To make a change to an asset, the published version of the asset is maintained in the knowledge graph and a new version of the asset is added to the graph (e.g., a new version node representing the new version is generated). The new version of an asset is added to a knowledge graph initially as a draft version that can be edited. The status indicator associated with the new version has an initial state indicating that the new version is a draft. After an approval process, the draft version is published in the knowledge graph (e.g., the state of the status indicator is changed to indicate publication), meaning that the version can no longer be edited. Prior version(s) of the asset remain stored in the graph even as new versions are added.

In the knowledge graph 100, a root node 102 represents a data asset associated with the term "ABC123" and another root node 128 represents a data asset associated with the term "CDE123." A node in a knowledge graph that represents a data asset associated with a term is sometimes referred to as a node that represents that term. Two version nodes 106 and 110 each representing a respective published version of the data asset associated with the term "ABC123" are connected to the root node 102 by respective edges 104 and 108. Metadata associated with a version node in the knowledge graph 100 (e.g., the version node 106, 110), the edge corresponding to a version node (e.g., the edge 104, 108, respectively), or both provide information about the status of the version represented by the version node. In the example of FIG. 1A, metadata associated with the version node 110 include a version identifier ("Version: 2") that indicates that the node 110 represents the second version of the asset represented by the root node 102. In some examples, metadata (e.g., a status indicator) associated with a version node can indicate whether the version is a draft or published version of the asset. For instance, a status indicator can have one state (e.g., "false" or a value of 0) when the version is a draft and a second state (e.g., "true" or a value of 1) when the version is a published version. Further description of version nodes is provided in U.S. patent application Ser. No. 17/384,547, the contents of which are incorporated here by reference in their entirety.

When a change is made to the knowledge graph, an automated process of determining suggestions for new nodes and/or new edges to be generated in the knowledge graph is triggered. A change to a data asset that triggers a suggestion process is sometimes referred to as an event. An example event is the generation of a new root node or version node (e.g., generation of the version node 110) or the publication of a new version of a data asset (e.g., a change in status of the version node 110 from draft status to published status). The data asset that is subject to the change is referred to as a changed data asset.

The process of determining suggestions for new nodes and/or new edges involves identifying terms that are present in the changed data asset, e.g., by analyzing the content (e.g., text) of the changed data asset, and comparing those terms to terms that are already represented by nodes in the knowledge graph. For instance, the content of the changed data asset can be analyzed to identify business terms, terms of relevance to a particular topic, or other types of terms. In some examples, a term that is present in the changed data asset is not represented by any node in the knowledge graph. A suggestion can be made to generate a new node to be generated in the knowledge graph 100 to represent that term (the term in the changed data asset that is not yet represented by any existing node in the knowledge graph). In some examples, a term that is present in the changed data asset is represented by an existing node in the knowledge graph, but that existing node is not related (e.g., directly or indirectly) to the version node of the changed data asset in the knowledge graph. The fact that that term is present in the changed data asset indicates that there may be a relationship between that term and the changed data asset (e.g., a conceptual relationship). A suggestion can be made to generate a new edge between the changed data asset (e.g., the version node representing the changed data asset) and the existing node in the knowledge graph that represents that term.

A suggestion node is generated in the knowledge graph 100 to represent each suggestion, e.g., to represent each suggested node and each suggested edge. Each suggestion node is connected to the node corresponding to the changed data asset (e.g., to the latest version node of the data asset) by an edge.

Figure 1B:
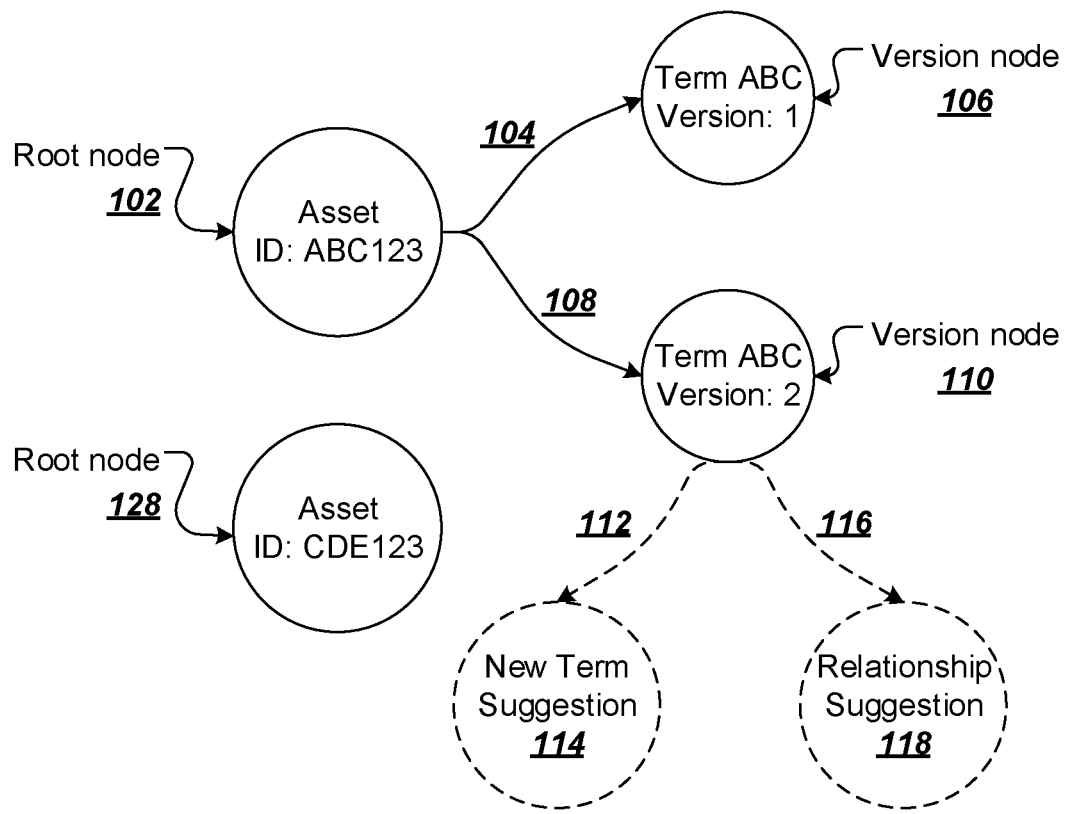

FIG. 1B illustrates the knowledge graph 100 including two suggestion nodes 114 and 118 connected by respective edges 112 and 116 to the version node 110 that represents the changed data asset represented by the version node 110. The suggestion node 114 represents a suggestion for a new node (e.g., a new node to represent a term "BCD123;" see FIG. 1C) to be generated in the knowledge graph 100. The suggestion of a new node to represent a term reflects that that term is present in the changed data asset (e.g., in the content, such as text, of the changed data asset) but that is not represented by a node of the knowledge graph. The suggestion node 118 represents a suggestion for a new edge between the version node 110 and an existing node in the knowledge graph 100, e.g., node 128 representing the term "CDE123." The suggestion of a new edge reflects that a term that is present in the content of the changed data asset is represented by a node in the knowledge graph (e.g., the node 128), but that node (e.g., node 128) is not connected directly or indirectly to the version node 102 of the changed data asset.

In a specific example, the root node 102 represents a data asset associated with the term "account number." The terms "sales prospect" and "contract" are found in the content of the latest version of the "account number" data asset, which indicates that there may be a conceptual relationship between "sales prospect" and "account number" and between "contract" and "account number." When terms in other, existing nodes of the knowledge graph are analyzed, it is determined that the term "sales prospect" is not represented by any existing node of the knowledge graph. A suggestion node (e.g., the suggestion node 114 of FIG. 1B) is generated to represent a suggested new node to represent the term "sales prospect." The term "contract," though, is already represented by an existing node of the knowledge graph (e.g., the node 128 of FIG. 1B), but no edge exists between the "contract" node 128 and the node 110 representing the latest version of the "account number" data asset. A suggestion node (e.g., the suggestion node 118) is generated to represent a suggested new edge between the "contract" node 128 and the version node 110 for the "account number" data asset. In the example of FIG. 1B, the suggested new edge is between the latest version node 110 and the existing node 128. In some implementations, the system creates a new version node, e.g., a node representing a third version of the data asset "account number" (not illustrated); the suggested new edge is between the new version node and the existing node 128.

Implementation of a suggestion involves generation of a new node or new edge in the knowledge graph as indicated by the suggestion. In some examples, the system enables display of information indicative of the suggestions on a user interface. The user interface allows the user to accept, reject, or defer the suggestion. A new node or edge is generated in the knowledge graph responsive to the user's acceptance of the suggestion. In some examples, suggestions are implemented automatically without user input.

Figure 1C:
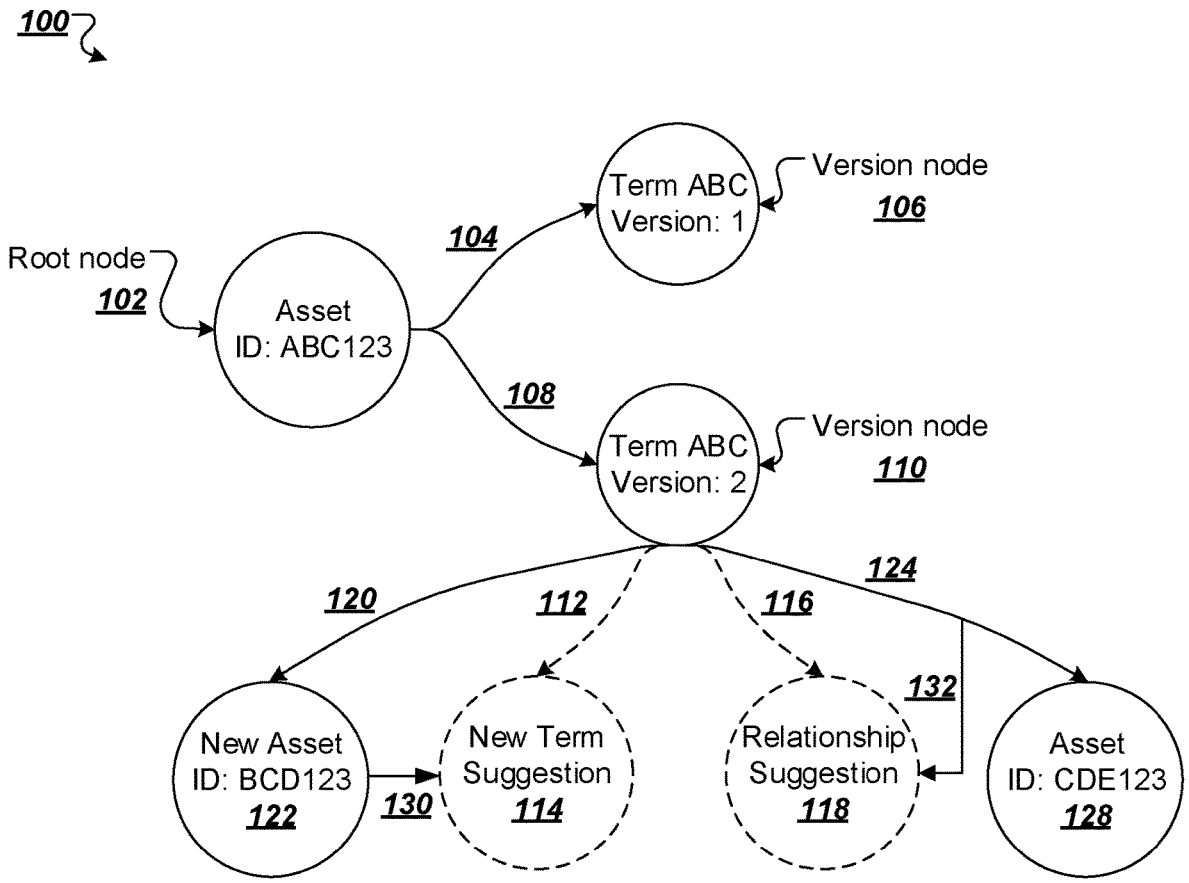

FIG. 1C illustrates the knowledge graph 100 with a new node 122 and a new edge 124 generated according to the suggestions represented by the suggestion nodes 114 and 116, respectively. The new node 122 represents the term "BCD123," which had been identified as a term in the changed data asset "ABC123" that was not represented by an existing node in the knowledge graph. The new node 122 and the version node 110 are connected in the knowledge graph 100 by an edge 120 to indicate a relationship between the latest version of the data asset "ABC123" and the data asset "BCD123." The connection between the new node 122 and the version node 110 can help with tracking of versions of edges. In the example of FIG. 1C, the new node 122 and the corresponding suggestion node 114 are connected by an edge 130, e.g., directed from the new node 122 to the suggestion node 114, to indicate the source of the suggestion.

The new edge 124 establishes a relationship, in the knowledge graph, between the previously existing node 128 representing the term "CDE123" and the version node 110 representing the latest version of the changed data asset. In the example of FIG. 1C, the new edge 124 and the corresponding suggestion node 118 are connected by an edge 132, e.g., directed from the edge 124 to the suggestion node 118, to indicate the source of the suggestion.

The direction of new edges generated based on suggestions, e.g., edges 120 and 124, can be from the version node of the changed data asset to the previously existing node or new node, from the previously existing node or new node to the version node of the changed data asset, or can be bidirectional.

In some examples, the suggestion nodes 114 and 118 remain in the knowledge graph 100 even after implementation of the corresponding suggestions. In some examples, if the user rejects or defers a suggestion, the corresponding suggestion node remains in the knowledge graph 100 but no node or edge is generated for that suggestion. In some examples, if the user rejects a suggestion, the corresponding suggestion node is deleted from the knowledge graph. The retention of suggestions can be useful, e.g., for improving suggestion algorithms or for troubleshooting. For example, analysis of which suggestions the user accepts, defers, or declines can improve the process of generating suggestions.

In some examples, new nodes and new edges that are generated based on suggestions are connected to the root node 102 of a data asset rather than to a version node of the data asset.

Figure 2:
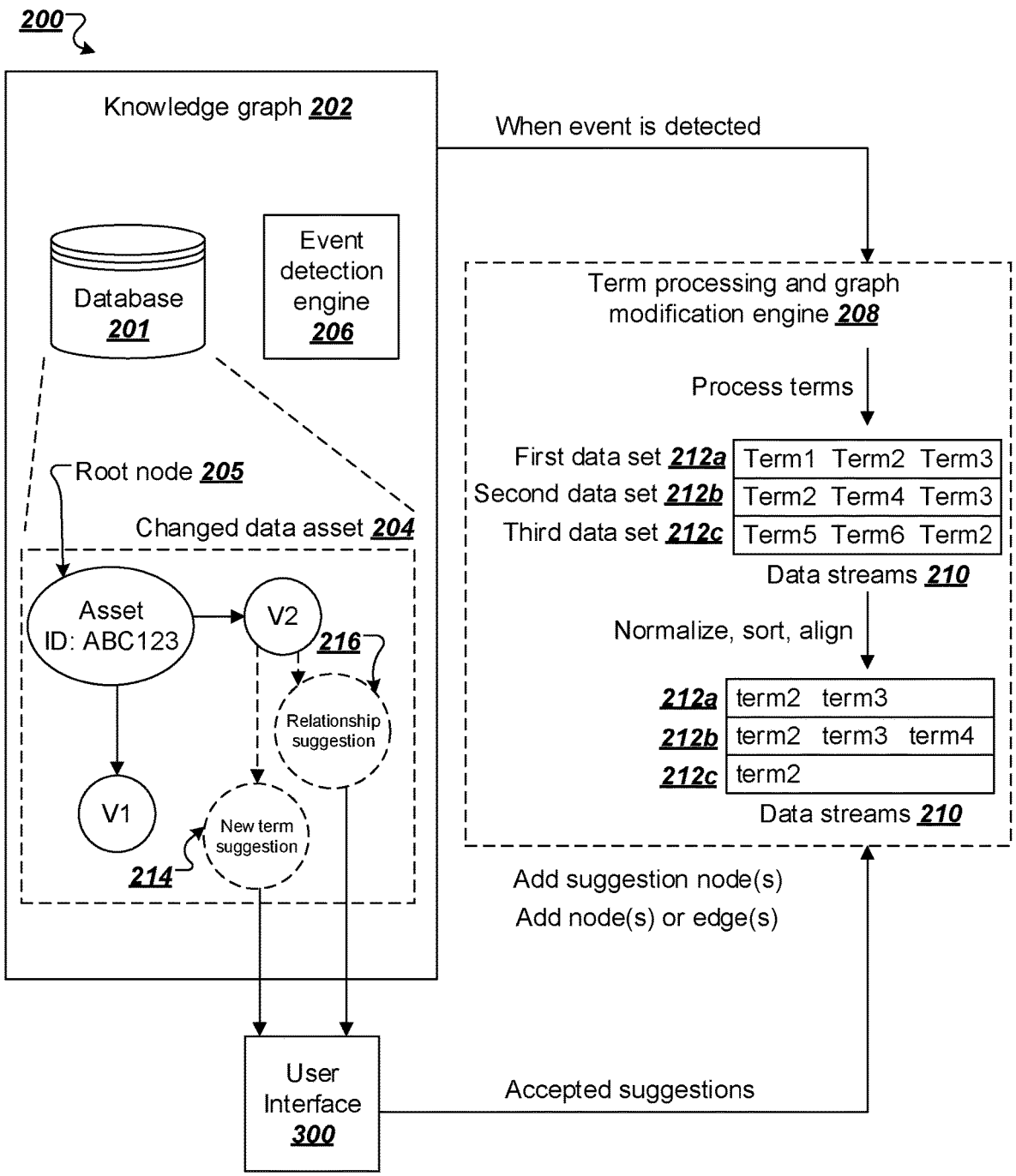
FIG. 2 illustrates an example suggestion system.

FIG. 2 illustrates an example suggestion system 200. The system 200 is event-driven, meaning that the system 200 generates suggestions upon detecting the occurrence of an event (e.g., a change to a data asset) in a knowledge graph 202. For instance, any change to the knowledge graph passes through an Application Programming Interface (API), which outputs an indicator of an event when implementing the change. Example events that can trigger operation of the suggestion system 200 include the generation of a new root node or version node or the publication a new version of an existing data asset in the knowledge graph 202. The newly generated data asset or the new version of the existing data asset is referred to as the changed data asset. In general, the suggestion system 200 generates suggestions for new nodes and/or new edges to be generated in the knowledge graph 100 based on identifying candidate terms from the changed data asset 204.

The knowledge graph 202 includes a database 201 that stores data assets and relationships, and an event detection engine 206, such as an API, that outputs an indicator that an event has occurred in the knowledge graph. In the example of FIG. 2, the event detection engine 206 detects the publication of a new version of a data asset 204 represented by a root node 205 of the knowledge graph 202, with the new version represented by a version node V2. In some implementations, the event detection engine 206 is implemented separately from the knowledge graph 202.

Upon detecting a changed data asset 204 in the knowledge graph 202, the event detection engine 206 provides an indicator of the change to a term processing and graph modification engine 208. In some implementations, the event detection engine 206 transmits an identifier of the changed data asset (e.g., "ABC123" in this example) and an identifier of the newly published version ("V2" in this example) to the engine 208.

The term processing and graph modification engine 208 processes the changed data asset 204 and generates one or more suggestions for new nodes to be generated in the knowledge graph 202, new edges to be generated between existing nodes in the knowledge graph 202, or both. Processing the changed data asset includes identifying one or more terms in the changed data asset, e.g., in text in the changed data asset. For instance, the content of the changed data asset can be analyzed to identify business terms, terms of relevance to a particular topic, or other types of terms. The terms that are identified based on the analysis of the changed data asset are referred to as candidate terms. The engine 208 also identifies one or more existing terms in data assets in the knowledge graph other than the changed data asset 204. In some examples, the existing terms are the terms represented by the nodes of the knowledge graph other than the root node 205 of the changed data asset 204. In some implementations, the engine 208 identifies the existing terms at the same time of processing the changed data asset. In some implementations, the existing terms were previously identified, e.g., upon generation or change of each data asset, and stored in a data store, such as a database or spreadsheet.

Identifying terms from data assets in the knowledge graph 202 can be performed by applying natural language processing to the text associated with the data assets. Applying natural language processing can include identifying one or more entities (e.g., nouns) in the text associated with the data assets. In some implementations, the system 200 applies a term recognition model that is trained on a set of previously determined terms (e.g., relevant business terms) to identify candidate terms.

The term processing and graph modification engine 208 compares each candidate term with each of the existing terms identified in the data assets other than the changed data asset. One output of the comparison can be a set of candidate terms that do not correspond with any existing terms in the knowledge graph. For instance, the engine 208 may identify that the term "sales prospect" is present in the changed data asset but is not represented by an existing node in the knowledge graph. Another output of the comparison can be a set of candidate terms that each corresponds to a respective existing term associated with an existing data asset that is not related to the root node 205 of the changed data asset.

For instance, the engine 208 may identify that the term "contract" is present in the changed data asset and is associated with a data asset represented by another node, but that other node is not connected directly or indirectly to the version node of the changed data asset.

In an example implementation, to process the changed data asset, the engine 208 generates three data sets: (1) a first data set 212a that includes one or more existing terms from the knowledge graph 202, (2) a second data set 212b that includes one or more candidate terms from the changed data asset 204, and (3) a third data set 212c that includes one or more existing terms that are related to the version node V2 of the changed data asset 204 in the knowledge graph 202. A term is related to a version node when a node that represents the data asset for that term is connected directly or indirectly to the version node by an edge in the knowledge graph. In some implementations, the first, second, and third data sets 212a-212c contain a set of terms in a tabular format. In some examples, the data sets 212a-212c are stored in a data store, such as a database or spreadsheet. In some examples, the data sets are streams of data that are received and processed, e.g., in real time, by the engine 208.

In some examples, to generate the first data set 212a, the engine 208 identifies one or more existing terms in each data asset in the knowledge graph other than the changed data asset. In some implementations, the engine 208 identifies terms in all existing data assets in the knowledge graph other than the changed data asset. In some implementations, the engine 208 identifies terms in fewer than all of the existing data assets, e.g., only from data assets of a same category or type as the changed data asset. In some implementations, the first data set is generated each time a change is processed. In some implementations, the first data set is generated in advance (e.g., prior to processing a change) and stored in a database. For instance, the first data set can be a stored data set that is updated, e.g., at regular intervals or upon occurrence of an event.

To generate the second data set 212b, the engine 208 identifies candidate terms from the content of the changed data asset, e.g., from text associated with the changed data asset. Following the specific example described above, the terms "sales prospect" and "contract" are identified from the content of the "account number" data asset and added to the second data set.

To generate the third data set 212c, the engine 208 identifies terms that are related to the version node V2 of the changed data asset 204 in the knowledge graph 202. Continuing with the example, the engine 208 identifies another node (not illustrated) that is connected (directly or indirectly) to the version node V2 by an edge of the knowledge graph 202 and identifies the term "contract" from that the data asset represented by that related node. The term "contract" is then added to the third data set.

After generating the first, second, and third data sets 212a-212c, the engine 208 normalizes the terms in each data set by applying one or more rules (e.g., rendering each term in lowercase, removing whitespace in each term, and/or stemming each term). The engine 208 sorts the normalized terms in each data set (e.g., alphabetically). The engine 208 groups the sorted and normalized terms based on a comparison of the terms across data sets to generate three groups of terms, e.g., so that like terms between data sets are aligned with one another.

The first group of terms contains candidate terms that exist in all three data sets 212a-212c, meaning that these candidate terms already exist in the knowledge graph 202 and are related to the changed data asset 204 (e.g., are associated with existing nodes in the knowledge graph that are connected to the newly published version node V2 of the changed data asset 204 by an edge). Accordingly, no suggestion is generated for the candidate terms in the first group. For example, as shown in FIG. 2, a "term2" exists in the first, second, and third data sets 212a-212c, indicating that a node for "term2" already exists in the knowledge graph 202 and is related to the changed data asset 204. Thus, the engine 208 does not generate a suggestion for "term2."

The second group of terms contains candidate terms that exist in the second data set 212b, but not in the first and the third data sets 212a, 212c, meaning that these candidate terms do not exist in the knowledge graph 202 (e.g., there is no node in the knowledge graph 202 that represents any of the candidate terms of the second group). Accordingly, the engine 208 generates a suggestion for a new node to represent each of these candidate terms. For example, a "term4" exists only in the second data set 212b, indicating that a node for "term4" does not exist in the knowledge graph 202. Thus, the engine 208 generates a suggestion for a new node to represent "term4."

The third group of terms contains candidate terms that exist in the first and the second data sets 212a-212b, but not in the third data set 212c, meaning that these terms exist in the knowledge graph 202 but are not related to the version node V2 of the changed data asset 204 (e.g., a node for each of these terms exists but is not connected to the version node V2). Accordingly, the engine 208 generates a suggestion for a new edge between the version node V2 and the node for each of these candidate terms. For example, a "term3" exists in the first and the second data sets 212a-212b, but not in the third data set 212c, indicating that a node for "term3" exists in the knowledge graph but is not related to the version node V2. Thus, the engine 208 generates a suggestion for a new edge between the version node V2 and the existing node for "term3."

The engine 208 and generates a suggestion node in the knowledge graph 202 corresponding to each suggestion (e.g., a suggestion node for each suggested new node and each suggested new edge). A new term suggestion node 214 represents a suggested new node for a candidate term that exists only in the second data set 212b. A new relationship suggestion node 216 represents a suggested new edge between the version node (V2) of the changed data asset 204 and an existing node for a candidate term that exists in the first and the second data sets 212a-212b, but not in the third data set 212c. In the example of FIG. 2, the new nodes 214 and 216 are connected to the version node V2 for the changed data asset 204 via respective edges. In some examples, the new nodes are connected to the root node for the changed data asset.

Information indicative of the suggestions can be displayed through a user interface 300. The user interface 300 allows a user to accept, reject, or defer each suggestion. The user interface 300 outputs information indicative of user interaction with the user interface, e.g., a user's acceptance, rejection, or deferral of each suggestion, back to the engine 208.

When the user accepts a suggestion to generating a new node for a candidate term (e.g., as represented by the suggestion node 214), the engine 208 generates a new node in the knowledge graph representing a new data asset for the candidate term and connects the new node to the version node V2 representing the changed data asset 204 by an edge. In some implementations, the engine 208 generates an edge between the new node and the suggestion node 214 to indicate the source of the corresponding suggestion.

When the user accepts a suggestion to generate a new relationship (e.g., as represented by the suggestion node 216), the engine 208 generates a new edge between the version node V2 representing the changed data asset 204 and the existing node indicated by the suggestion node 216. In some implementations, the engine 208 generates an edge between the new edge and the suggestion node 216 to indicate the source of the corresponding suggestion.

When the user rejects or defers a suggestion, the engine 208 does not add a node or edge according to the rejected or deferred suggestion to the knowledge graph 202.

In some implementations, the system 200 can apply suggestions without user input. For example, the system 200 can identify a subset of the suggestions that are considered to be urgent and apply these suggestions to the knowledge graph, e.g., by generating nodes and/or edges, without the user's input. In some examples, all suggestions are applied automatically.

Figure 3:
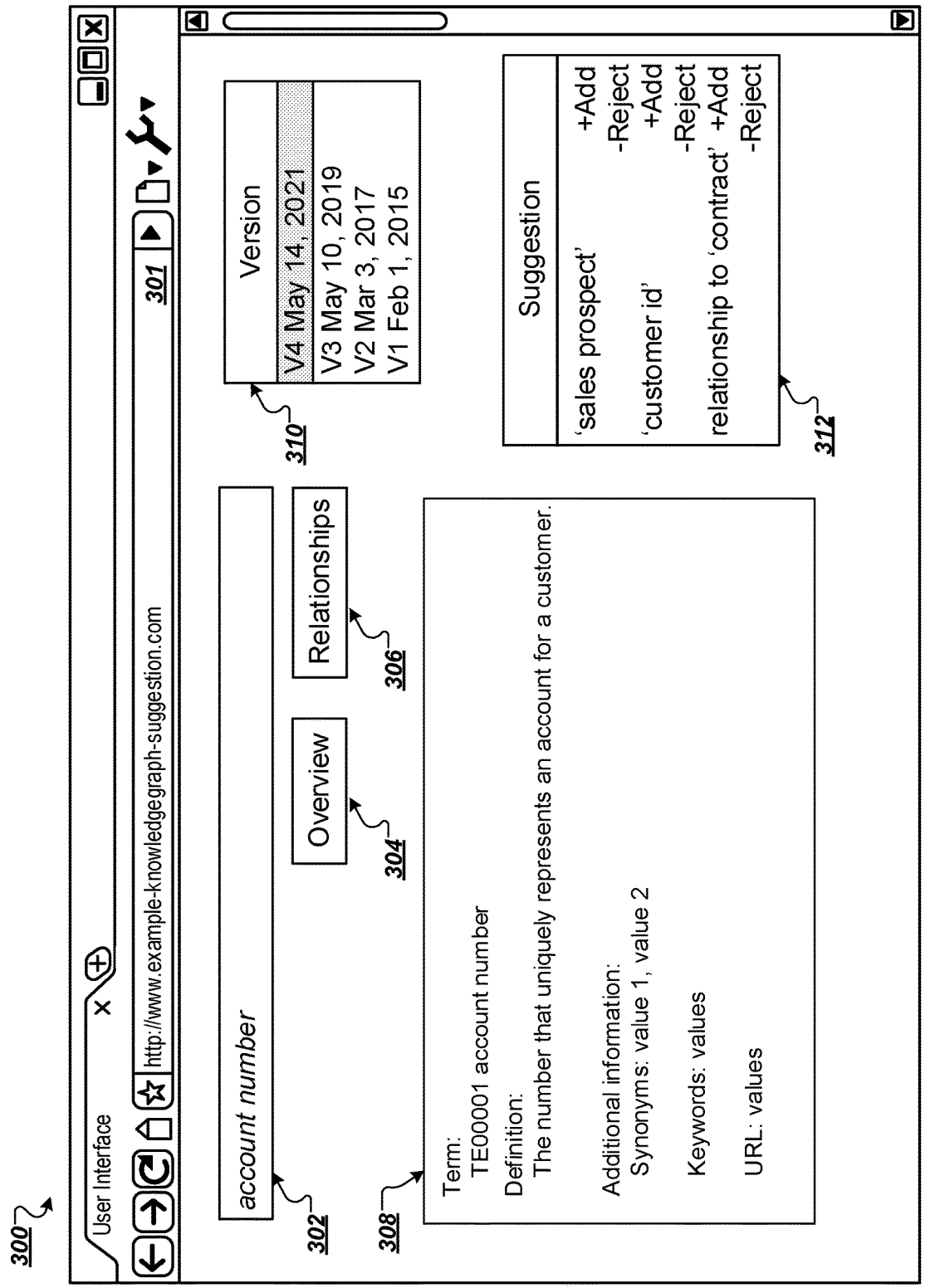
FIG. 3 illustrates an example user interface.

FIG. 3 illustrates an example user interface 300 to a knowledge graph. The user interface 300 is generated at least in part using data provided by a computer system, such as a system that provides an website, and may be displayed by a browser program operating on a user computing device, such as personal computer connected to the computer system over a network, e.g., the Internet. In the example shown, the user interface 300 is displayed by the browser program under an example web address 301. The example web address 301 contains at least an address that users can type on the browser program to reach the user interface 300. Other mechanisms of display can also be used.

The user interface 300 includes a search query entry field 302. To search for a term, the user may type the term (e.g., "account number") or an identifier of an asset associated with the term (e.g., "TE00001") into the search query entry field 302. The user may be an account holder of a user account, or an authorized user of an account on the user interface 300 of the knowledge graph. The text that the user enters in to the search query entry field 302 is used by a computer system (e.g., a web server) to generate a set of search results, e.g., whether the searched term is found in the knowledge graph, based on the search query using one or more search algorithms.

The user interface 300 includes a user selectable overview button 304. Selection of the overview button 304, e.g., by clicking on the overview button, prompts display of an overview window 308 for the term, including the term's identifier, definition, or other information such as synonyms, keywords, and associated URL. For example, after the user searches for the term "account number" using the search query entry field 302 and selects the overview button 304, the user interface 300 displays information about the data asset associated with the term "account number" in the overview window 308.

The user interface 300 includes a user selectable relationship button 306. The user's selection of the relationship button 306, e.g., by clicking on the relationship button, prompts display of the relationships between a data asset associated with the term and other assets stored in the knowledge graph (not illustrated). In some implementations, the term's overview window 308 is replaced by the term's relationship window when the user selects the relationship button 306. The term's relationship window can display a list of terms that are related to the searched term, e.g., in a tabular format.

The user interface 300 includes a version window 310 for navigating through different versions of a data asset associated with the term. The version window 310 presents several user selectable elements, each for each version of the term. For example, four versions of the data asset associated with the term "account number" are illustrated in FIG. 3. The user can access a particular version of the data asset by selecting the version displayed in the version window 310.

The user interface 300 includes a suggestion window 312. The suggestion window 312 displays suggestions, e.g., suggestions for new data assets or new relationships. For example, the suggestion window 312 displays the terms "sales prospect" and "customer id" as suggested new terms. The suggestion window 312 displays suggested new relationships, e.g., by displaying a proposed "relationship" to be generated between the data asset for the term and a data asset for another term (e.g., "relationship to 'contract'"). The user can accept (e.g., by selecting "+Add" button next to the suggestion), reject (e.g., by selecting "−Reject" button next to the suggestion), or defer each suggestion. In some implementations, the suggestion window 312 displays suggestions in a tabular form. In some implementations, the suggestion window 312 displays suggestions in a pop-up window. In some examples, when the user publishes a new version of a data asset, e.g., by making a change to the data asset, the suggestions displayed on the suggestion window 312 are updated to reflect new suggestions generated by the suggestion system 200.

Figure 4:
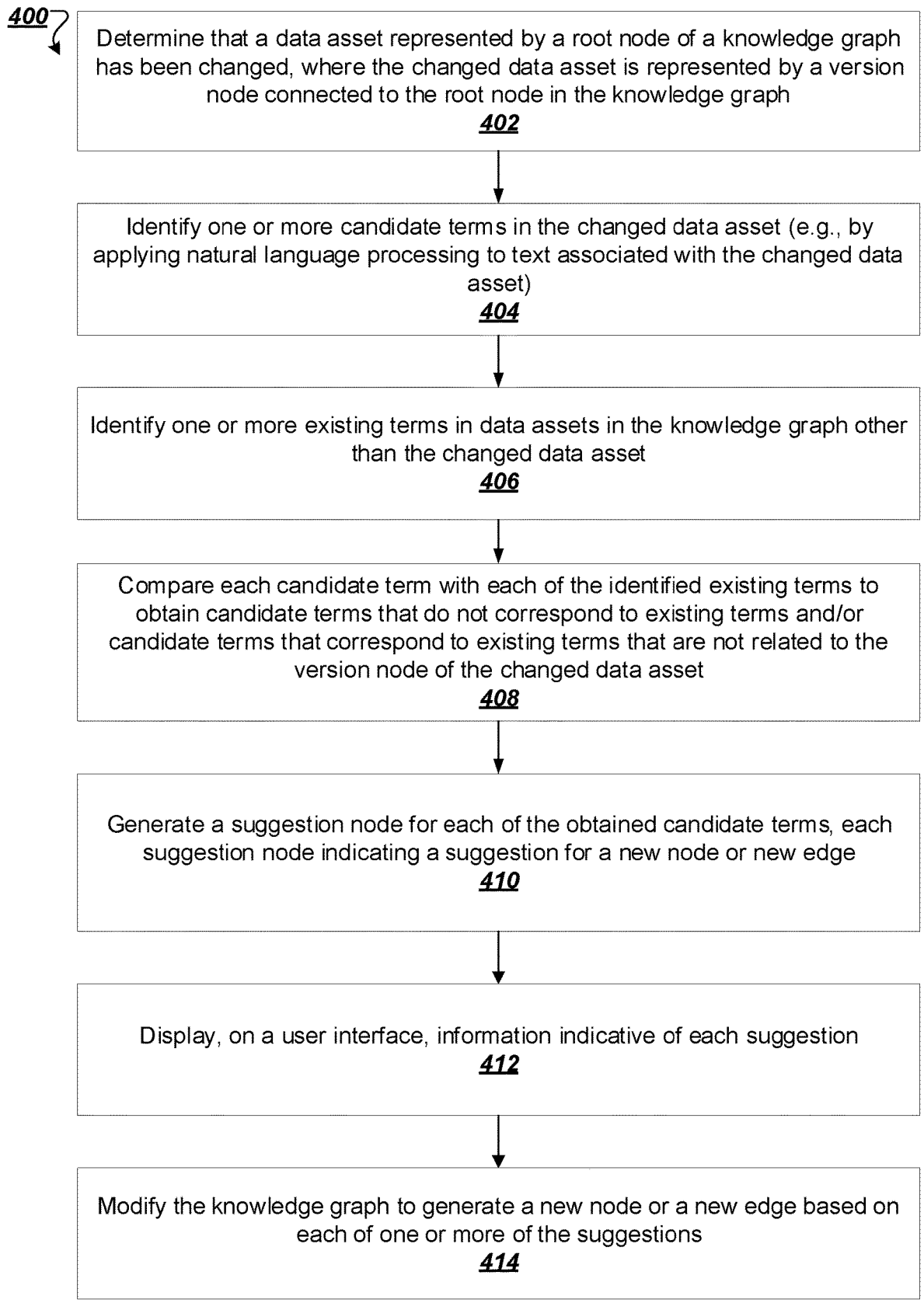
FIG. 4 illustrates a flowchart of an example process.

FIG. 4 illustrates a flowchart of an example process 400 for generating suggestions. The process will be described as being performed by a system including one or more processors programmed appropriately in accordance with this specification. For example, the suggestion system 200 of FIG. 2 can perform at least a portion of the example process. In some implementations, various steps of the process 400 for generating suggestions can be run in parallel, in combination, in loops, or in any order.

A data asset represented by a root node of a knowledge graph stored in a database is determined to have been changed (402). The knowledge graph is defined by nodes connected by edges. The changed data asset is represented by a version node connected to the root node. Example changes include the generation of a new data asset or the publication of a new version of an existing data asset. For example, the change can be the generation of a new version node or a change in status of a version node to indicate publication of a new version of the data asset.

One or more candidate terms, e.g., nouns having business relevance, are identified in the changed data asset (404). For instance, natural language processing can be applied to text associated with the changed data asset to identify one or more candidate terms.

One or more existing terms are identified in the data assets in the knowledge graph other than the changed data asset (406). In some examples, existing terms are identified when it is determined that a data asset has been changed. In some examples, existing terms are identified in advance, e.g., a list of existing terms is maintained in a database. In some implementations, the database is updated to introduce additional existing terms each time a data asset is changed.

Each candidate term is compared with each of the one or more existing terms (408) to obtain one or more candidate terms that do not correspond to any existing terms and/or one or more candidate terms that each corresponds to a respective existing term that is not related to the version node of the changed data asset. For instance, a first data set including the one or more existing terms, a second data set including the one or more candidate terms, and a third data set including one or more existing terms that are already related to the version node of the changed data asset in the knowledge graph are generated and processed. An existing term that is related to the version node is a term represented by an existing node of the knowledge graph that is connected, directly or indirectly, to the version node of the changed data asset. In some examples, the terms in each data set are normalized and sorted, and the sorted and normalized terms are grouped based on a comparison of terms across the first, second, and third data sets. Normalizing the terms in each data set can include, e.g., rendering each term in lowercase, removing whitespaces in each term, and stemming each term. Sorting the normalized terms in each data set can include, e.g., sorting the terms in each data set alphabetically.

A suggestion node for each of the obtained candidate terms is generated (410). Each suggestion node indicates a suggestion for a new node or a new edge in the knowledge graph. Each suggestion node is connected to the version node representing the changed data asset by an edge of the knowledge graph. For each candidate term that corresponds to a respective existing term that is not related to the version node, the suggestion node indicates a suggested new edge to be generated between the node representing the existing term and the version node of the changed data asset. For each candidate term that does not correspond to any existing term, the suggestion node indicates a suggested new node for the candidate term.

Information indicative of each suggestion is displayed on a user interface (412). In some examples, a user selectable element to accept, reject, or defer the suggestion is also displayed. In some implementations, the user interface is displayed by a browser program, generated at least in part using data (e.g., the knowledge graph 202 that includes the database 201) provided by a computer system.

The knowledge graph is modified to generate a new node or a new edge based on each of one or more of the suggestions, e.g., in response to a user interaction with the user interface to accept the suggestion (414). For the case of the new node suggestion, the knowledge graph is modified to generate a new term node representing one of the candidate terms that does not correspond to any of the existing terms in the knowledge graph. The new term node is connected to the version node of the changed data asset by an edge of the knowledge graph. In some implementations, an edge is generated between the new term node and the suggestion node that indicates the suggestion for that new term node. For the case of the new edge suggestion, the knowledge graph is modified to generate a new edge between the version node of the changed data asset and a node representing one of the existing data assets. In some implementations, an edge is generated between the new edge and the suggestion node that indicates the suggestion for that new edge.

In some implementations, the suggestions are ranked based on a predicted impact to the knowledge graph of the new node or new edge corresponding to each of the suggestions. In some implementations, the impact of each suggestion is predicted based on the change in the topology of the knowledge graph that would occur if the suggestion were to be implemented. In some implementations, the impact of each suggestion is predicted based on the connectivity (e.g., centrality measures such as closeness centrality) of the suggestion in the knowledge graph. The rank of each suggestion can be used to determine, e.g., which suggestions to present to the user or the order of presentation of a set of suggestions, or to determine which suggestions are to be implemented automatically without user input. In some implementations, a subset of suggestions can be stored for analysis and not presented to the user.

In some implementations, duplicate suggestions are detected. Example duplicate suggestions include duplicate terms among candidate terms (e.g., the term "contract" appears twice as a candidate term) or duplicate terms between candidate terms and previous suggestions (e.g., the term "contract" is a candidate term but the same term was already previously suggested to the user). In some implementations, duplicate suggestion nodes that have already been generated in the knowledge graph are detected and removed such that only one suggestion node for each suggestion exists in the knowledge graph. In some implementations, in response to detecting duplicate suggestions, a single node representative of the duplicate suggestion is generated.

In some implementations, quality of suggestions can be improved by identifying suggestions that are more likely to be accepted by the user based on a prior history of the user's interaction with suggestions. For instance, predictive features in the texts can be extracted from the changed data asset using natural language processing.

One or more additional suggestion capabilities in addition to or instead of the capability to suggest new nodes and edges can be implemented. An example suggestion capability includes a trust calculation, where the knowledge graph is scanned and a score is assigned for each data asset based on how trusted the data associated with the data asset is. In some implementations, the extent to which the data is trusted is quantified by applying a pre-trained machine learning model that is trained on a set of labeled training data (e.g., a binary label indicating whether the data is trusted or not).

An example suggestion capability includes a rule scoring capability, where a semantic score of each rule is calculated for its adherence to a set of guidelines. The set of guidelines serves to facilitate consistent rules that are applied to the knowledge graph. In some implementations, the semantic score is based on the level of overlap between the structure and syntax of each rule and the set of guidelines.

An example suggestion capability includes a field-term suggestion, where relationships are suggested between different classes of data assets. For example, a relationship can be suggested and created between a field data asset and a term data asset.

An example suggestion capability includes a user value scoring, where a score is calculated and assigned for each user of the knowledge graph. The score can be based on the user's activity (e.g., change history of the knowledge graph) and the extent of impacts due to the user's activity.

In this specification, the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Memory stores program instructions and data used by the processor of the intrusion detection panel. The memory may be a suitable combination of random access memory and read-only memory, and may host suitable program instructions (e.g., firmware or operating software), and configuration and operating data and may be organized as a file system or otherwise. The program instructions stored in the memory of the panel may store software components allowing network communications and establishment of connections to the data network.

Program instructions stored in the memory, along with configuration data may control overall operation of the system. Server computer systems include one or more processing devices (e.g., microprocessors), a network interface and a memory (all not illustrated). Server computer systems may physically take the form of a rack mounted card and may be in communication with one or more operator terminals (not shown).

All or part of the processes described herein and their various modifications (hereinafter referred to as "the processes") can be implemented, at least in part, via a computer program product, e.g., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method comprising:
   determining, by one or more processors, that a data asset represented by a root node of a knowledge graph stored in a database has been changed, wherein the knowledge graph is defined by nodes connected by edges, and wherein the changed data asset is represented by a version node connected to the root node;
   responsive to and triggered by the determination, automatically processing, by the one or more processors, the changed data asset, including:
      applying a trained natural language term recognition model to identify one or more candidate terms in the changed data asset, and
      comparing each candidate term with each of one or more existing terms from data assets of the knowledge graph other than the changed data asset to obtain (i) one or more of the candidate terms that do not correspond to any existing term or (ii) one or more candidate terms that each corresponds to a respective existing term that is not related to the version node representing the changed data asset;
   generating, by the one or more processors, a suggestion node for each of the obtained candidate terms, each suggestion node connected to the version node representing the changed data asset, wherein each suggestion node indicates a suggestion for a new node or a new edge in the knowledge graph;
   by the one or more processors, enabling display, on a user interface, of information indicative of each suggestion; and
   responsive to user input approving a particular suggestion, modifying the data structure of the knowledge graph, including performing one or both of
      (i) generating a new node representing the candidate term for that suggestion and connecting the new node to the version node by an edge, or
      (ii) generating a new edge between the version node and an existing root node representing the candidate term for that suggestion.

2. The method of claim 1, comprising:
   identifying the one or more existing terms from the data assets in the knowledge graph other than the changed data asset.

3. The method of claim 1, wherein determining that a data asset has been changed comprises determining that the version node has been generated.

4. The method of claim 1, wherein each suggestion node is connected to the version node representing the changed data asset by an edge of the knowledge graph.

5. The method of claim 1, wherein identifying one or more candidate terms comprises identifying one or more nouns from the changed data asset.

6. The method of claim 1, wherein processing the changed data asset comprises generating and processing (i) a first data set comprising the one or more existing terms, (ii) a second data set comprising the one or more candidate terms, and (iii) a third data set comprising one or more of the existing terms that are already related to the version node of the changed data asset in the knowledge graph.

7. The method of claim 6, wherein processing the changed data asset comprising:
   normalizing the terms in each data set;
   sorting the normalized terms in each data set; and
   grouping the sorted and normalized terms based on a comparison of terms across the first, second, and third data sets.

8. The method of claim 1, wherein generating a suggestion node comprises, for each candidate term that corresponds to an existing term that is not related to the version node, generating a suggestion node representative of a suggested edge between a node representing the existing term and the version node.

9. The method of claim 1, wherein generating a suggestion node comprises, for each candidate term that does not correspond to any existing term, generating a suggestion node representative of a suggested new node for the candidate term.

10. The method of claim 1, wherein enabling display, on a user interface, of information indicative of the suggestion comprises enabling display of a user selectable element to accept, reject, or defer the suggestion.

11. The method of claim 1, wherein the generated new node is connected to the suggestion node for the particular suggestion by an edge of the knowledge graph.

12. The method of claim 1, comprising:
   detecting a duplicate suggestion based on the obtained candidate terms and previously generated suggestion nodes representative of previous suggestions; and
   in response to detecting a duplicate suggestion for a new node or new edge, generating a single suggestion node representative of the duplicate suggestion.

13. The method of claim 1, comprising:
   ranking the suggestions based on a predicted impact, to the knowledge graph, of the new node or new edge corresponding to each of the suggestions.

14. A system comprising: one or more processors and one or more storage devices storing instructions that are operable, when executed by the one or more processors, to cause the one or more processors to:
   determine that a data asset represented by a root node of a knowledge graph stored in a database has been changed, wherein the knowledge graph is defined by nodes connected by edges, and wherein the changed data asset is represented by a version node connected to the root node;
   responsive to and triggered by the determination, automatically process the changed data asset, including:
      applying a trained natural language term recognition model to identify one or more candidate terms in the changed data asset, and
      comparing each candidate term with each of one or more existing terms from data assets of the knowledge graph other than the changed data asset to obtain (i) one or more of the candidate terms that do not correspond to any existing term or (ii) one or more candidate terms that each corresponds to a respective existing term that is not related to the version node representing the changed data asset;

generate a suggestion node for each of the obtained candidate terms, each suggestion node connected to the version node representing the changed data asset, wherein each suggestion node indicates a suggestion for a new node or a new edge in the knowledge graph;

enable display, on a user interface, of information indicative of each suggestion; and responsive to user input approving a particular suggestion, modifying the data structure of the knowledge graph, including performing one or both of
   (i) generating a new node representing the candidate term for that suggestion and connecting the new node to the version node by an edge, or
   (ii) generating a new edge between the version node and an existing root node representing the candidate term for that suggestion.

15. The system of claim 14, wherein processing the changed data asset comprises generating and processing (i) a first data set comprising the one or more existing terms, (ii) a second data set comprising the one or more candidate terms, and (iii) a third data set comprising one or more of the existing terms that are already related to the version node of the changed data asset in the knowledge graph.

16. The system of claim 14, wherein generating a suggestion node comprises, for each candidate term that corresponds to an existing term that is not related to the version node, generating a suggestion node representative of a suggested edge between a node representing the existing term and the version node.

17. The system of claim 14, wherein generating a suggestion node comprises, for each candidate term that does not correspond to any existing term, generating a suggestion node representative of a suggested new node for the candidate term.

18. A non-transitory computer readable medium encoded with a computer program, the program comprising instructions that are operable, when executed by one or more processors, to cause the one or more processors to:

determine that a data asset represented by a root node of a knowledge graph stored in a database has been changed, wherein the knowledge graph is defined by nodes connected by edges, and wherein the changed data asset is represented by a version node connected to the root node;

responsive to and triggered by the determination, automatically process the changed data asset, including:
   applying a trained natural language term recognition model to identify one or more candidate terms in the changed data asset, and
   comparing each candidate term with each of one or more existing terms from data assets of the knowledge graph other than the changed data asset to obtain (i) one or more of the candidate terms that do not correspond to any existing term or (ii) one or more candidate terms that each corresponds to a respective existing term that is not related to the version node representing the changed data asset;

generate a suggestion node for each of the obtained candidate terms, each suggestion node connected to the version node representing the changed data asset, wherein each suggestion node indicates a suggestion for a new node or a new edge in the knowledge graph;

enable display, on a user interface, of information indicative of each suggestion, and responsive to user input approving a particular suggestion, modifying the data structure of the knowledge graph, including performing one or both of
   (i) generating a new node representing the candidate term for that suggestion and connecting the new node to the version node by an edge, or
   (ii) generating a new edge between the version node and an existing root node representing the candidate term for that suggestion.

* * * * *

UNITED STATES PATENT AND TRADEMARK OFFICE
CERTIFICATE OF CORRECTION

PATENT NO. : 11,922,326 B2
APPLICATION NO. : 17/896927
DATED : March 5, 2024
INVENTOR(S) : Kyl Wellman et al.

It is certified that error appears in the above-identified patent and that said Letters Patent is hereby corrected as shown below:

In the Claims

Column 20, Line 29, Claim 18, delete "suggestion," and insert -- suggestion; --

Signed and Sealed this
First Day of October, 2024

Katherine Kelly Vidal
*Director of the United States Patent and Trademark Office*